US012596848B2

(12) United States Patent
Huopana et al.

(10) Patent No.: US 12,596,848 B2
(45) Date of Patent: Apr. 7, 2026

(54) METHOD OF VERIFYING INTEGRITY OF DATA FROM A DEVICE UNDER TEST

(71) Applicant: Siemens Industry Software Inc., Plano, TX (US)

(72) Inventors: Antti Huopana, Oulu (FI); Kari Vierimaa, Kempele (FI); Miika Niiranen, Pirkkala (FI)

(73) Assignee: Siemens Industry Software Inc., Plano, TX (US)

( * ) Notice: Subject to any disclaimer, the term of this patent is extended or adjusted under 35 U.S.C. 154(b) by 77 days.

(21) Appl. No.: 18/683,959

(22) PCT Filed: Aug. 26, 2021

(86) PCT No.: PCT/IB2021/057818
§ 371 (c)(1),
(2) Date: Feb. 15, 2024

(87) PCT Pub. No.: WO2023/026079
PCT Pub. Date: Mar. 2, 2023

(65) Prior Publication Data
US 2024/0370588 A1 Nov. 7, 2024

(51) Int. Cl.
*G06F 21/64* (2013.01)

(52) U.S. Cl.
CPC .................................. *G06F 21/64* (2013.01)

(58) Field of Classification Search
CPC .......... G06F 21/64; H04L 1/242; H04L 1/244
See application file for complete search history.

(56) References Cited

U.S. PATENT DOCUMENTS 7,343,535 B2 * 3/2008 Lai ......................... G11C 29/48
714/724
9,876,588 B2 * 1/2018 Yuan .................. H04B 17/0085
(Continued)

FOREIGN PATENT DOCUMENTS

EP 1290810 A2 3/2003
WO 2001089130 A2 11/2001

OTHER PUBLICATIONS

PCT International Search Report and Written Opinion of International Searching Authority mailed Apr. 29, 2022, corresponding to PCT International Application No. PCT/IB2021/057818.
(Continued)

*Primary Examiner* — Khalid M Almaghayreh
(74) *Attorney, Agent, or Firm* — Lempia Summerfield Katz LLC

(57) ABSTRACT
A method of verifying integrity of data from a device under test includes obtaining network data from the device under test, wherein the network data is generated by the device under test based on a test data from a source device by transforming the test data from a first domain to a second domain and framing the transformed test data in a first protocol. The method further includes: deframing the received network data from the first protocol to a second protocol for extracting the transformed test data; obtaining the test data from the source device for verifying the transformed test data; and verifying the integrity of the transformed test data based on the test data using a block error rate or a bit error rate.

8 Claims, 2 Drawing Sheets

(56) References Cited

U.S. PATENT DOCUMENTS

| | | | |
|---|---|---|---|
| 2005/0135259 A1* | 6/2005 | Yazdi | H04J 3/14 |
| | | | 370/241 |
| 2014/0119421 A1* | 5/2014 | El-Hassan | H04B 17/29 |
| | | | 375/227 |
| 2014/0194069 A1* | 7/2014 | Liu | H04W 24/00 |
| | | | 455/67.14 |
| 2017/0077988 A1* | 3/2017 | Flask | H04L 1/24 |
| 2017/0170916 A1* | 6/2017 | Olgaard | H04B 17/29 |
| 2019/0187200 A1* | 6/2019 | Gondi | H04B 17/15 |

OTHER PUBLICATIONS

PCT International Preliminary Examination Report and Written Opinion of International Examination Authority mailed Oct. 16, 2023, corresponding to PCT International Application No. PCT/IB2021/057818.

* cited by examiner

FIG 2

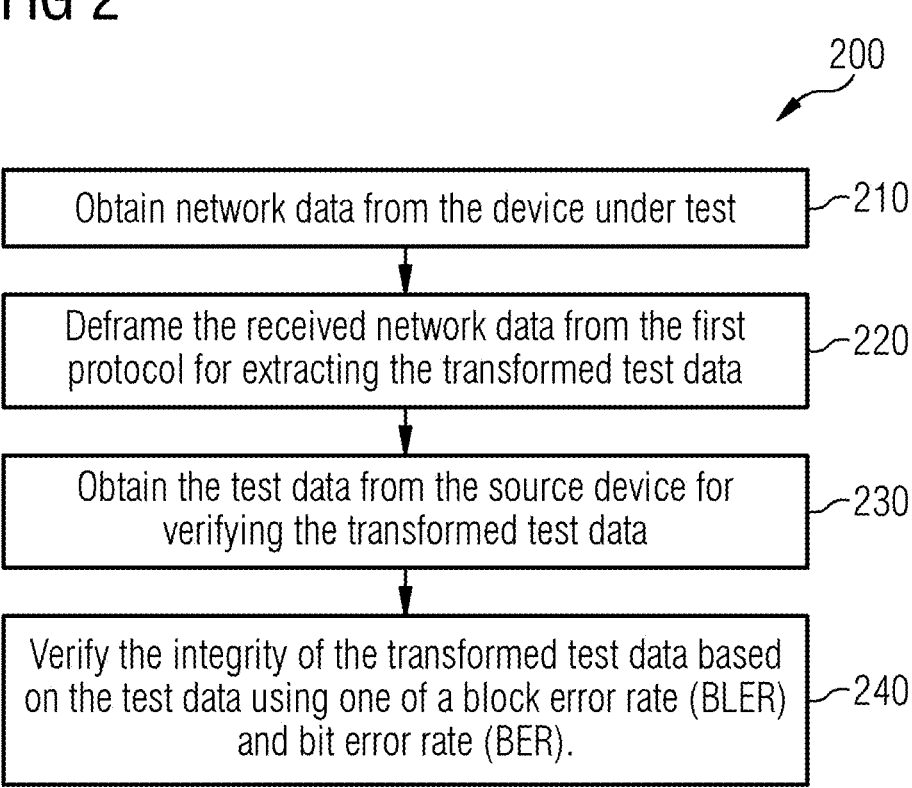

210 — Obtain network data from the device under test

220 — Deframe the received network data from the first protocol for extracting the transformed test data 230 — Obtain the test data from the source device for verifying the transformed test data 240 — Verify the integrity of the transformed test data based on the test data using one of a block error rate (BLER) and bit error rate (BER).

FIG 3

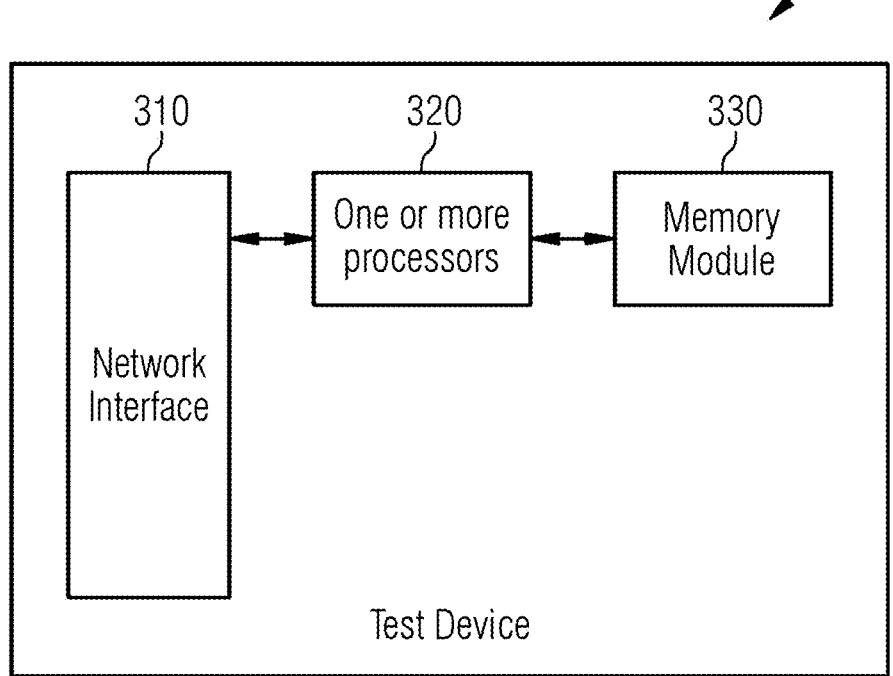

310 — Network Interface

320 — One or more processors

330 — Memory Module

Test Device

METHOD OF VERIFYING INTEGRITY OF DATA FROM A DEVICE UNDER TEST

The present patent document is a § 371 nationalization of PCT Application Serial No. PCT/IB2021/057818, filed Aug. 26, 2021, designating the United States, which is incorporated by reference in its entirety.

TECHNICAL FIELD

The current disclosure relates to testing of radio devices and more particularly relates to evaluation of data integrity of data from a radio device under test.

BACKGROUND

Conventionally, 4G/5G Fronthaul Networks include a multi-protocol Fronthaul Switch that converts Fronthaul protocols on the fly. Unlike scenarios where data is kept in its original domain, (e.g., time or frequency domain), this Fronthaul Switch also needs to transform antenna data from time domain to frequency domain and vice versa, due to the nature of the Fronthaul protocols involved. Data conversion performed by the fronthaul switch may be verified by checking the integrity of the data from the switch after the conversion.

SUMMARY AND DESCRIPTION

The scope of the present disclosure is defined solely by the appended claims and is not affected to any degree by the statements within this summary. The present embodiments may obviate one or more of the drawbacks or limitations in the related art.

The current disclosure relates to testing of radio devices especially radio device which perform data conversion. As mentioned above, 4G/5G Fronthaul Networks include devices that perform data conversion such as multi-protocol fronthaul switches, radio units, etc., that perform protocol conversion on the fly. Unlike scenarios where data is kept in its original domain, (e.g., time or frequency domain), such conversions may require transformation of antenna or radio data from time to frequency domain and vice versa, due to the nature of the protocols involved. To check or test the functionality of the device, a data conversion operation may be performed by the radio device and the resultant data may be verified by checking the integrity of the data after the conversion.

Such data integrity check may be performed using pseudo-random binary sequences (PRBS). Pseudo-random binary sequences (referred to as PRBS hereafter) are a sequence of binary bits generated in a deterministic fashion and retain their bit sequence when repeated. Accordingly, PRBS may be used in continuity testing (data integrity verification) due to their self-synchronizing and continuous nature. Using PRBS, it is possible are able to identify gaps or errors in a data stream simply by looking at two adjacent data values. However, the use of PRBS assumes no filtering on the PRBS payload to keep the data intact. Accordingly, PRBS may not be effective when the data conversion includes transformation antenna data from time to frequency domain. This is the case because band-pass filtering is applied during in the FFT/iFFT process, which makes it impossible to use traditional continuity testing methods because samples no longer correlate in their digital form. Accordingly, to utilize PRBS, certain aspects of the device under test have to be modified or turned off. However, this does not provide a complete test of the device under test. Accordingly, there is a need for a method for testing that is able to test data integrity even after transformation of data from one domain to another.

Accordingly, the current disclosure describes a method of verifying integrity of data from a device under test. The method includes obtaining network data from the device under test, wherein the network data is generated by the device under test based on a test data from a source device by transforming the test data from a first domain to a second domain and framing the transformed test data in a first protocol. The method further includes: deframing the received network data from the first protocol to a second protocol for extracting the transformed test data; obtaining the test data from the source device for verifying the transformed test data; and verifying the integrity of the transformed test data based on the test data using a block error rate (BLER) or a bit error rate (BER).

Accordingly, the current disclosure describes a method where the data integrity check is performed on the converted data by determining a block error rate or bit error rate using the original test data. With the help of known antenna test model in the test data, the bit error rate algorithm is able to detect noise applied to the digital test data that traversed through the device under test. In certain examples, in RF systems, BER or BLER illustrates the quality of received signal after channel effects, fading, and other impurities. In a digital domain, however, the only possible sources of noise or errors in antenna data are errors in protocol conversion or data mapping, packet loss or buffer under/overruns in the Fronthaul Switch. Accordingly, BER or BLER effectively reveals any data integrity issues when data is transferred through the device under test, across time/frequency domain conversion. The noise detected by the BER algorithm, and the presence of noise (non-zero BER) implies errors in data integrity. Additionally, BER and BLER do not suffer from FFT/iFFT, unlike PRBS whose frequency profile is more of that of white noise that is damaged in band-pass filtering. Accordingly, the above method does not require changing reference implementation, nor it does not require the device under test to switch off filtering algorithms (e.g., band-pass filtering) needed in real conversion from time to frequency domain.

In an example, the test data is generated by the source device using a test model. Accordingly, the testing of the device under test may be performed in a test environment using the test model to simulate various test conditions. Additionally, the test model may be implemented in a test software and accordingly testing of the device under test may be performed primarily using software components. In an example, the network data include PRBS, wherein verifying the integrity includes verifying the bit error rate related to the PRBS. Accordingly, the above method may be used for data associated with radio communication including PRBS data. In an example, the transmission of test data from the source device to the device under test is via a lossless transmission channel or a wired digital transmission channel. Accordingly, there is no data loss or corruption resulting from transmission and accordingly any errors detected are due to the data conversion performed by the device under test. In an example, the first domain is a time domain or a frequency domain, and the second domain is the other of time domain and the frequency domain. In an example, the device under test is a radio unit or a gateway device for connecting a radio unit to a distributed unit.

In another aspect, a test device is disclosed for verifying integrity of data from a device under test. The test device includes a network interface for receiving network data from the device under test, wherein the network data is generated by the device under test based on a test data by transforming the test data from a first domain to a second domain and framing the transformed test data in a first protocol. The test device further includes one or more processors connected to a memory. The one or more processors are configured to: deframe the received network data from the first protocol to a second protocol for extracting the transformed test data; and verify the integrity of the transformed test data based on the test data using a block error rate (BLER) or a bit error rate (BER). In an example, the test device is configured to generate the test data using a test model and transmit the test data to the device under test. In an example, the test data is transmitted to the device under test from a source device, wherein the source device is configured to generate the test data using a test model. The advantages of the method are relevant to the test device as well. These aspects are further explained in relation to FIGS. 1-3.

BRIEF DESCRIPTION OF THE DRAWINGS

FIG. 2 illustrates an example of a method of verifying integrity of data from a device under test.

FIG. 3 illustrates an example of a test device for verifying integrity of data from a device under test.

DETAILED DESCRIPTION

Figure 1:
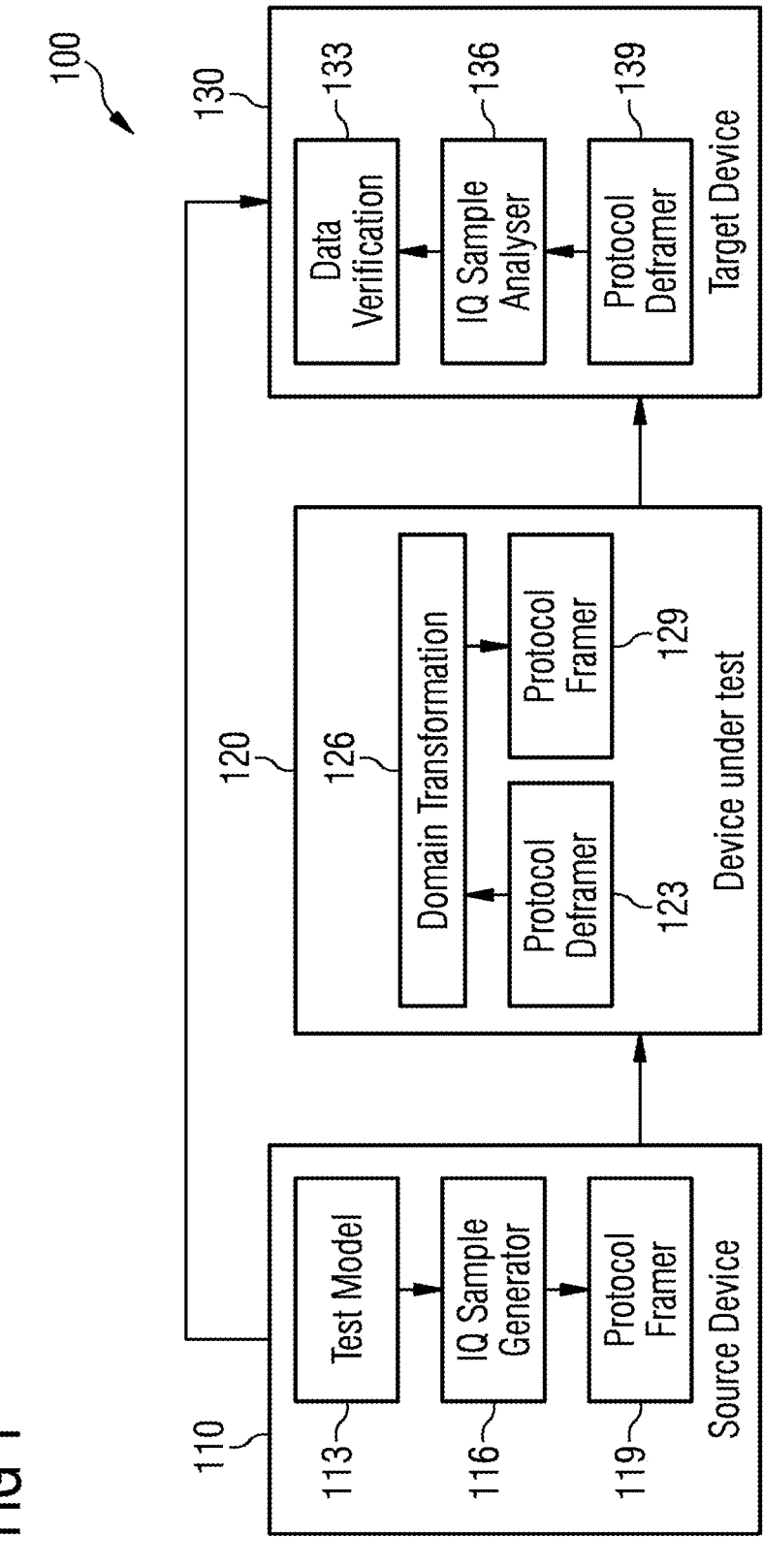
FIG. 1 illustrates an example of a test environment for testing a radio device.

FIG. 1 illustrates a test environment 100 for testing a radio device 120 (also referred to as device under test 120). In addition to the device under test 120, the test environment includes a source device or a sender device 110. The sender device 110 is configured to generate the test data and transmit the test data to the device under test 120. The sender device 110 includes a test model 113 (e.g., 3GPP test model 113 with known data), IQ Sample generator 116 to create payload of IQ samples in a first domain (either time domain or frequency domain), and protocol framer 119 that wraps the IQ sample data in a particular first protocol (for example Common Public Radio Interface, CPRI). The test model 113 generates test information that is fed into IQ Sample Generator 116, which generates IQ samples (also referred to as test data) from the test information, which is then fed as payload into protocol framer 119. Then, the test data is transmitted to the device under test 120. The transmission of the test data happens over a lossless transmission channel, for example, a digital wired communication channel such as ethernet. This provides that the transmitted test data is not subject to any corruption due to physical phenomenon associated with wireless or radio communication.

The device under test 120 includes a Protocol deframer 123 and a Protocol framer 129. The protocol deframer 123 is able to extract the payload (e.g., IQ samples) from the test data in the first protocol. The protocol deframer 123 includes a protocol stack associated with the first protocol (e.g., protocol used by the protocol framer 119 of the source device 110). After extracting the test data using the protocol deframer 123, the device under test 120 is configured to frame the test data in a second protocol. However, in order to frame the test data in the second protocol, the IQ samples are converted from the first domain (time or frequency domain) to a second domain (other of the time or frequency domain).

Accordingly, the device under test 120 includes a domain transformation module 126, which is configured to transform the test data from one domain to another. For example, the data transformation module 126 is configured to transform the test data from time domain to frequency domain using fast Fourier transform (FFT). Similarly, the data transformation module 126 is configured to transform the test data from frequency domain to time domain using inverse fast Fourier transform (iFFT). Accordingly, the device under test 120 converts the test domain from the first domain to the second domain using the domain transformation module 126. Then, the transformed test data is provided to the protocol framer 129. The protocol framer includes a protocol stack (e.g., one or more protocols associated with the second protocol) using which the test data is framed in the second protocol. Subsequent to the warping the test data in the second protocol, the device under test 120 transmits the test data to a receiver device 120. Similar to the transmission from the source device 110 to device under test 120, the transmission of the test data from device under test 120 to the receiver device 130 happens over a lossless transmission channel, for example, a digital wired communication channel such as ethernet. This provides that the transmitted test data is not subject to any corruption due to physical phenomenon associated with wireless or radio communication. The test data in the second protocol format is referred to as network data.

The receiver device 120 includes a protocol deframer 139, IQ sample analyzer 136, and verification module 133. The protocol deframer 139 is configured to receive the test data in the second protocol from the device under test 120 and extract the test data (e.g., the payload of the IQ samples). The IQ sample analyzer is configured to analyze the received IQ samples in the test data. However, prior to analysis of the IQ samples, the verification of the IQ samples is performed using the verification module 133. The verification module 133 is configured to check the integrity of the test data (e.g., the IQ samples). This is further explained in relation to FIG. 2.

FIG. 2 illustrates a method 200 of verifying integrity of data from a device under test 120. The method 200 is implemented by the receiver device 130. At act 210, the receiver device 130 obtains network data from the device under test 120. As mentioned previously, the network data is generated by the device under test 120 based on the test data from the source or sender device 110 by transforming the test data from the first domain to the second domain and framing the transformed test data in the second protocol.

At act 220, the receiver device 130 deframes the received network data from the second protocol for extracting the transformed test data. As mentioned above, the IQ samples are extracted from the received network data using the protocol deframer 139.

At act 230, the receiver device 130 obtains the test data from the source device 110 for verifying the transformed test data. The receiver device 130 coordinates with the source device 110 for receiving the original test data over a lossless transmission channel. The original test data includes the IQ samples generated by the IQ sample generator 116 based on the test information from the test model 113.

At act 240, the receiver device 130 verifies the integrity of the transformed test data based on the test data using a block error rate (BLER) or a bit error rate (BER). Prior to verification, in an example, the receiver device 130 is configured to transform the test data from the second domain to the first domain. It also may be noted that such transformation (e.g., from the second domain to the first domain) is not necessary for the application of BER or BLER. Then, the receiver device 130 compares the test data from the device under test 120 against the original test data to determine bit error rate or block error rate. For performing the mentioned above comparison, other operations as known in the state of the art such as demodulation, etc., may be carried out to determine the content of the transformed test data. Based on the bit error rate or the block error rate, the receiver device 130 is able to determine if the device under test is functioning properly. Bit error rate, as known in the state of the art, refers to the number of bit errors in the test data (e.g., IQ samples) divided by the total number of transferred bits during a studied time interval. Block error rate, as known in the state of the art, refers to the ratio between the total number of blocks transmitted in test data (e.g., IQ samples) and the number of blocks in test data received in error.

In RF systems, BER or BLER may illustrate the quality of received signal after channel effects, fading, and other impurities. In current method, however, the only possible sources of noise or errors in antenna data are errors in protocol conversion or data mapping, packet loss, or buffer under/overruns in the device under test 120. Accordingly, BER or BLER effectively reveals any data integrity issues when data is transferred through the device under test, across time/frequency domain conversion. The presence of noise (e.g., non-zero BER or BLER) implies errors in data integrity. Additionally, BER and BLER do not suffer from FFT/iFFT, unlike PRBS whose frequency profile is more of that of white noise that is damaged in band-pass filtering.

In an example, the network data include PRBS generated by the source device 110. Accordingly, the receiver device 130 is configured to verify the integrity of the test data from the device under test 120 based on bit error rate related to the PRBS. While the above method has been explained using a generic device under test 120, the device under test 120 is a gateway device, (e.g., fronthaul switch), capable of transmitting and receiving data between a distributed unit and a radio unit of the distributed base station. In another example, the device under test is a radio unit connected to a distributed unit. In an example, the sender device may be radio device (for example, a radio unit) connected to the device under test using a digital wired device or system and configured to transmit test data based on a test condition or test scenario. While the above method 200 is explained using a sender device 110 and a receiver device 130, the functionality of the sender device 110 and receiver device 130 may be implemented via software on a test device. This is further explained in relation to FIG. 3.

FIG. 3 illustrates a test device 300 for verifying integrity of data from a device under test. The test device 300 includes a network interface 310 for receiving network data from the device under test, where the network data is generated by the device under test based on a test data by transforming the test data from a first domain to a second domain and framing the transformed test data in a second protocol. The test device further includes one or more processors 420 connected to a memory 430. The memory (also referred to as non-transitory storage module 430) includes a plurality of instructions that, when executed by the one or more processors 420, cause the one or more processors to deframe the received network data from the second protocol for extracting the transformed test data and verify the integrity of the transformed test data based on the test data using a block error rate (BLER) or a bit error rate (BER). As mentioned above, since the source device 110 functionality is implemented in the test device 30, the test device 300 is configured to generate the test data using a test model and transmit the test data to the device under test. However, the test device may only include the functionality of the receiver and accordingly, the test data is transmitted to the device under test from a source device distinct from the test device.

For the purpose of this description, a computer-usable or computer-readable non-transitory storage medium may be any apparatus that may contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology may be centralized or distributed (or a combination thereof) as known to those skilled in the art.

In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be applied to device/non transitory storage medium claims.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method of verifying integrity of data from a device under test, the method comprising:
    generating, by a source device, test data;
    framing, by the source device, the test data in a first protocol;
    transmitting, by the source device, the test data in the first protocol to the device under test;
    receiving, by a receiver device, network data from the device under test, wherein the network data is generated by the device under test based on the test data received from the source device by transforming the test data from a first domain to a second domain and framing the transformed test data in a second protocol, and wherein the network data comprises pseudo-random binary sequences (PRBS);

deframing, by the receiver device, the received network data from the second protocol for extracting the transformed test data;

obtaining, by the receiver device, the test data from the source device for verifying the transformed test data; and verifying, by the receiver device, an integrity of the transformed test data based on the test data using a bit error rate related to the PRBS.

2. The method of claim 1, wherein the test data is generated by the source device using a test model.

3. The method of claim 1, wherein transmission of the test data from the source device to the device under test is via a lossless transmission channel or wired digital transmission channel.

4. The method of claim 1, wherein the first domain is a time domain or a frequency domain and the second domain is the other of the time domain and the frequency domain.

5. The method of claim 1, wherein the device under test is: (1) a gateway device for connecting a radio unit to a distributed unit or (2) the radio unit.

6. A test device for verifying integrity of data from a device under test, the test device configured to generate test data, frame the test data in a first protocol, and transmit the test data in the first protocol to the device under test, the test device comprising:

a network interface for receiving network data from the device under test, wherein the network data is configured to be generated by the device under test based on the test data by transforming the test data from a first domain to a second domain and framing the transformed test data in a second protocol, and wherein the network data comprises pseudo-random binary sequences (PRBS); and one or more processors connected to a memory, the one or more processors configured to:

deframe the received network data from the second protocol for extracting the transformed test data; and verify an integrity of the transformed test data based on the test data using bit error rate related to the PRBS.

7. The test device of claim 6, wherein the test device is configured to generate the test data using a test model and transmit the test data to the device under test.

8. The test device of claim 6, wherein the test data is configured to be transmitted to the device under test from a source device, and wherein the source device is configured to generate the test data using a test model.

* * * * *